May 12, 1931.   F. HODGKINSON   1,804,616
MULTISTAGE FEED WATER HEATING
Filed Nov. 19, 1925   2 Sheets-Sheet 1

F. Hodgkinson
INVENTOR

May 12, 1931. F. HODGKINSON 1,804,616
MULTISTAGE FEED WATER HEATING
Filed Nov. 19, 1925 2 Sheets-Sheet 2

WITNESS
F. Hodgkinson
INVENTOR
BY
ATTORNEY

Patented May 12, 1931

1,804,616

UNITED STATES PATENT OFFICE

FRANCIS HODGKINSON, OF SWARTHMORE, PENNSYLVANIA, ASSIGNOR TO WESTINGHOUSE ELECTRIC AND MANUFACTURING COMPANY, A CORPORATION OF PENNSYLVANIA

MULTISTAGE FEED WATER HEATING

Application filed November 19, 1925. Serial No. 70,137.

My invention relates to steam power plants, particularly to a system for plants which employ multiple stage turbines and has for an object to provide, in connection with a plant of this type, a feed water heating system which combines a means for the heating, storing, and deaerating of the feed water and a utilization of vapors generated in the deaeration of the heated feed water or liberated on the condensate from a higher temperature heater being exposed to the lower pressure in a lower temperature heater, the automatic passing of noncondensable vapors as formed in the heaters to the turbine enhancing the value of the heating surface.

Figure 1:
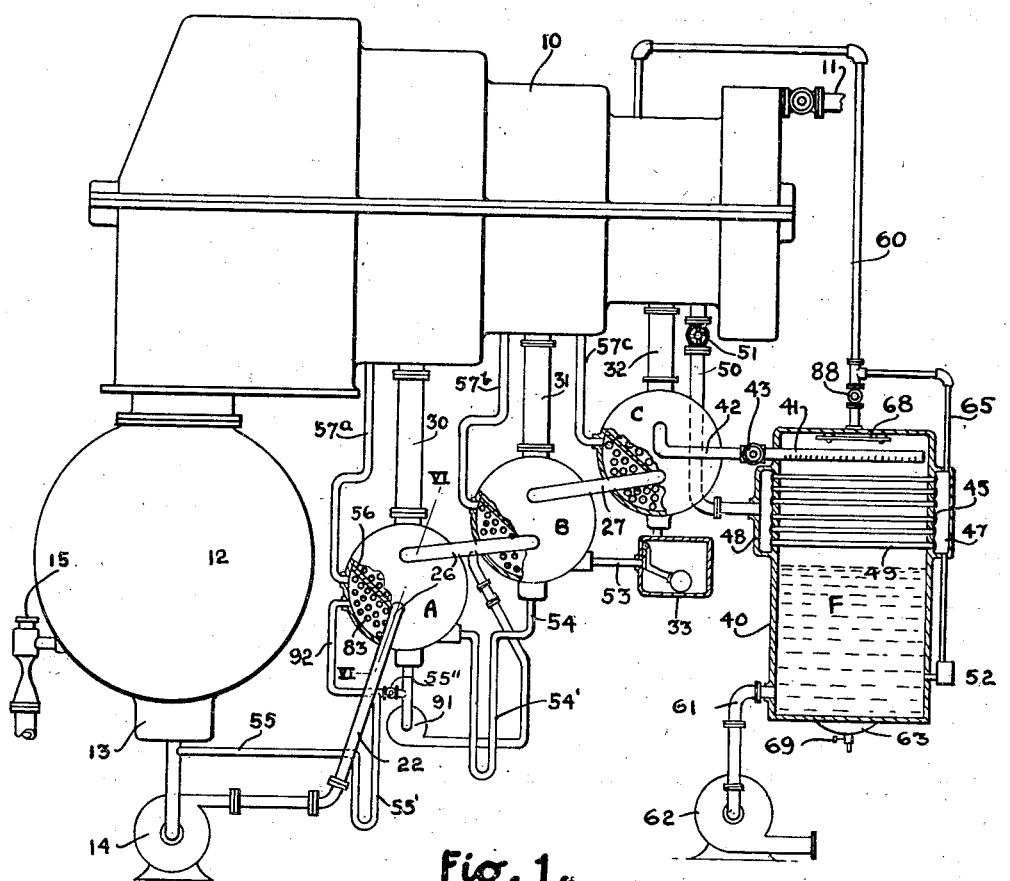
Figure 2:
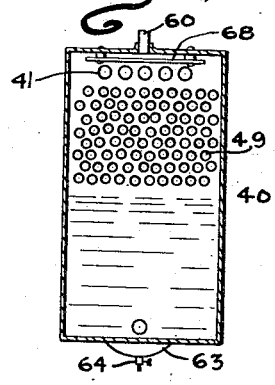
Figure 7:
Figure 6:
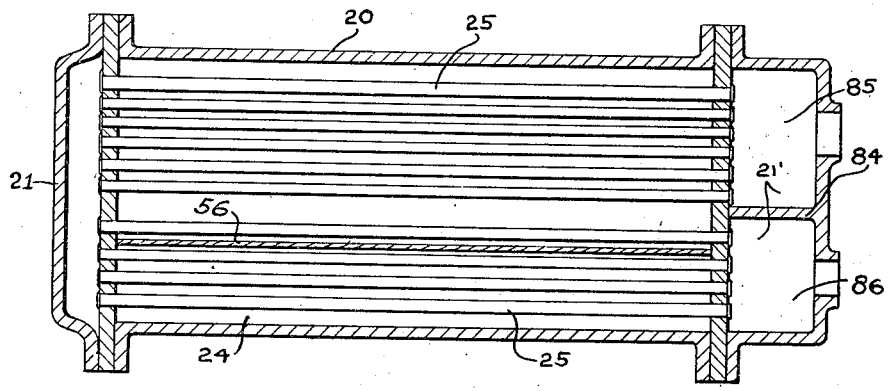
Figures 4, 5:
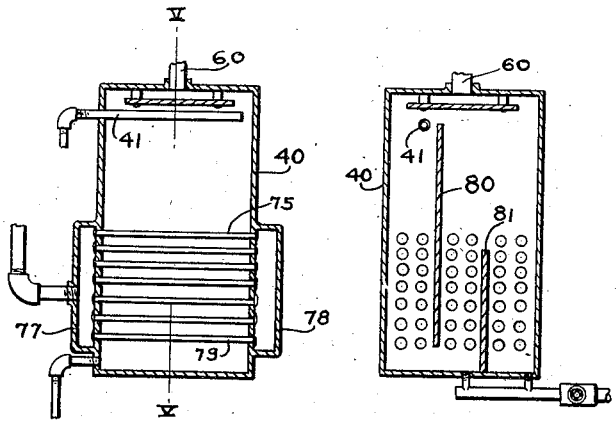
Figure 3:
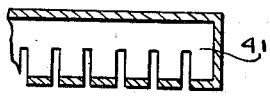

These and other objects of my invention which are more manifest in the further description thereof may be attained by the employment of the apparatus illustrated in the accompanying drawings in which Fig. 1 is a schematic view of a portion of a power plant illustrating an embodiment of a feed water preheating system constructed in accordance with my invention; Fig. 2 is a view in section through the deaeration tank illustrated in Fig. 1; Fig. 3 is a detail view, on an enlarged scale, of a water spraying pipe illustrated in Fig. 1; Fig. 4 is a sectional view of a modified form of deaerating tank; Fig. 5 is a sectional view, on the line V—V of Fig. 4; Fig. 6 is a sectional view on the line VI—VI of Fig. 1; and Fig. 7 is a transverse section of the heater A showing the baffle arrangement.

In the drawing I show a multi-stage turbine 10 receiving steam from a conduit 11 and exhausting into a condenser 12. This condenser has a hot well 13 from which condensate is removed by a pump 14 and has an air pump 15 which serves to remove uncondensed fluids from the condenser. The parts named above are of the conventional type and form per se no part of my invention.

A multiple-stage feed water heater is disposed in proximity to the turbine and condenser and, as shown, is composed of one or more stage heater elements, three being shown at A, B and C respectively. The structure of each of the heater elements may be identical if more than one is used and the description of one, therefore, suffices for all.

Each heater comprises a shell 20, having water boxes 21 and 21', and a steam chamber 24 traversed by the tubes 25—25 which open into the water boxes 21 and 21'. The steam chamber 24 is provided with a baffle 56 which serves to form a cooling chamber 83. The water box 21' is provided with a partition 84 forming spaces 85 and 86 so arranged that all of the tubes passing through the cooling chamber 83 come from the same space 85. Condensate from the hot well 13 of the condenser 12 is delivered by the pump 14 and a conduit 22 to the space 86 of the water box 21' of the heater A, thence through the tubes to the opposite water box 21, thence through the tubes to the space 85 of the water box 21', thence through a conduit 26 to the heater B where it passes through the tubes, from whence it passes through a conduit 27 to the heater C. From heater C it passes to a surge tank F hereinafter more fully described.

Steam is tapped from different stages of the turbine 10 and is led by pipes 30, 31 and 32 to the chambers 24 of the heaters A, B and C respectively, the arrangement being such that the heaters A, B and C receive steam from progressively higher pressure stages of the turbine in the order named.

The surge or storage tank F comprises a closed shell 40 of ample capacity to care for surges in the feed water demand of the plant. In the upper portion of the shell 40 are disposed water supply pipes 41—41 connected to receive water from the last stage heater C through a pipe 42 and a distributing header 43. The spray pipes 41 are provided with suitable apertures for directing downwardly the heated water from the heaters in streams with large exposed surfaces; thus, the pipes 41 may be slotted on the under side as shown in Fig. 3 so as to deliver thin sheets of sprayed water or constructed in any other well known manner. Beneath the spray pipes 41 I provide a surface heater 45, preferably of such a construction as to receive water from the spray pipe on its heating surface and the water is caused to flow by the aid of gravity in films over successive heating surfaces. As shown, I employ a horizontal tubular heater having distributing boxes 47 and 48 and connecting tubes 49. Steam from a high pressure stage of the turbine is led to the box 48 of the heater through a conduit 50 which is provided with a valve 51. Leading from the top of the tank F is a conduit 60 which connects the upper part of the interior of the tank F with an intermediate stage of the turbine slightly lower than that to which heater C connects. During operation this portion of the tank is filled with vapor. The purpose of the conduit 60 is to maintain a pressure in the tank F such that under the influence of the heater 45 boiling of the water and a liberation of air occluded therein will take place in the tank F, which air and vapor are delivered to such lower stage of the turbine as will ensure flow through the conduit 60 with minimum thermal loss. The conduit 60 must be of sufficient size to pass all non-condensable vapor, which vapor will also contain certain condensable vapor. This entails a slight thermal loss. The amount of boiling in the surge tank is partially controlled by a valve 88, in order to secure the proper degree of deaeration. Satisfactory operating conditions are maintained when the pressure in tank F is slightly lower than that in the heater of highest temperature, which correspondence of temperature and pressure may be attained, with sufficient approximation for all practical purposes, by inserting the end of the conduit 60 at a pressure stage of the turbine lower than that from which the pipe 32 withdraws steam for the last stage heater C by an amount corresponding to the temperature of the water in said last stage heater. In this arrangement the heat required for vaporizing the water and driving off the air therefrom in the tank F is supplied through the heater 45 and hence the amount of vapor generated is limited and under control for all operating conditions of the turbine, either by restricting flow from the high pressure stage to the tank F or by restricting flow from tank F to the lower stage 60.

The heated and deaerated feed water is withdrawn from the tank F by means of a conduit 61 and a pump 62; a settling chamber 63 and blow off cocks 69 may be also provided at the bottom of the tank F.

Means for the removal of condensate and uncondensed fluids from the several heaters may be provided in any suitable manner, such as that shown. The water of condensation from the box 47 of the heater 45 is led through a trap 52 into the surge tank 40. The water of condensation from the heater C is led through a conduit 53 having a float trap 33' into the heater B, or if the pressure range between heaters B and C is not too great, a seal similar to that between heaters A and B may be employed. The water of condensation from the heater B is led through a conduit 54 provided with a seal 54' to the heater A. The water of condensation of the heater A is delivered by a pump 91 to the conduit 26. To provide for operation in case of failure of the pump 91, a conduit 55 provided with a seal 55' is provided, discharging into the hot well suction of the pump 14. A valve 55" closes this conduit when the pump 91 is in operation. A vent 92 connects the conduit 55 with the heater A.

In order to ensure the flow of condensate from one heater to the other during light loads, when the pressure differences between the heaters are small the stage heater C may be partially elevated above the stage heater B, which, in turn, may be partially elevated above the stage heater A. Tubes containing water of the first pass of the condensate pass through the cooling space 83 under the baffle 56. Conduits 57a, 57b and 57c lead from the cooling spaces of the heaters A, B and C, respectively, to stages of the turbine which have a slightly lower pressure than that from which steam is bled for supplying heat to the respective heaters. I may provide a vent 65 from box 47 to pipe 60 for the purpose of removing non-condensable vapors from the heater 45.

The operation of the above described apparatus, is briefly as follows:

Assuming the turbine to be in operation, water from the condenser is delivered by means of the pump 14 and conduit 22 to the water box 21' of the first stage heater A. From this heater the condensate flows through the heaters B and C into the surge tank 40 where it is sprayed over the heater 45. Steam is bled from the turbine 10 through the conduit 50 to the heater 45. The steam in the heater 45 is condensed and flows into the surge tank through the trap 52. The non-condensable vapors, together with some steam, flow through the conduit 65 into the conduit 60 and thence to the turbine; the purpose of this being to prevent air binding of the heater 45. Steam bled through the conduit 32 flows through the steam space of the heaters C where it gives up its heat to the condensate in the tubes. The major portion of this steam is condensed and flows through piping 53 to the steam space of the heater B. This condensate having a higher temperature than the water being heated in the heater B assists in the heating of this water. The non-condensable gases are carried off through conduit 57c. Stage heaters B and A are supplied with heating steam through conduits 31 and 30 respectively, the condensate being discharged through conduit 54 and 55 and the non-condensable gases through conduits 57b and 57a. Air liberated by deaeration in the tank 40 is removed through the pipe 60. A baffle 68 may be employed to prevent the water from the spray pipe 41 being drawn into conduit 60.

In Figs. 4 and 5, I show a modified form of storage or surge tank. Like the storage tank illustrated in Fig. 1, it has a closed shell 40, a spray pipe 41 and a vapor offtake 60. In this embodiment, however, the heater is placed in the lower part of the shell 40 so as to submerge in the heated water. The heater 75 is in all respects similar to the heater 45, and consists of the boxes 77 and 78 connected by the heating tubes 79. If desired, baffles 80 and 81 may be provided within the shell 40 to direct the flow of water over the heating tubes in a more or less tortuous path.

The operation of my improved apparatus when employing the storage tank of Figs. 4 and 5 is not unlike that of the apparatus of Fig. 1. The heated water for the last stage heater C enters the tank and is sprayed downwardly, whereupon a mechanical separation of the gases from the water takes place, the gases escaping through the pipe 60. The body of water in the bottom of the tank is heated by the submerged heater 75 and a continuous boiling of the water is thereby effected. This boiling of the water in the tank liberates the gases occluded in the water, which gases pass off with steam through pipe 60 to the turbine where their energy is utilized.

In either embodiment, the air removed from the feed water in the storage tank, after being expanded in the turbine, finds its way into the condenser 12, from which it is eliminated by the air pump 15.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:

The combination with a multi-stage turbine and evacuating apparatus including a condenser connected to the exhaust opening of the turbine, of a deaerating chamber, means for supplying heated feed water to be deaerated to the deaerating chamber, and conduit means connecting the deaerating chamber with an intermediate stage of the turbine having a pressure below the saturation pressure of the feed water to be deaerated, said turbine, condenser and conduit means being arranged to draw liberated gases from the deaerating chamber and to utilize said gases as motive fluid in a relatively low pressure stage of the turbine.

In testimony whereof, I have hereunto subscribed my name this sixteenth day of November, 1925.

FRANCIS HODGKINSON.